United States Patent [19]

Walters

[11] Patent Number: 5,017,792

[45] Date of Patent: * May 21, 1991

[54] METHOD AND APPARATUS FOR DETECTING A SHEET STRIP MATERIAL MISFEED CONDITION

[75] Inventor: Harry J. Walters, Pittsburgh, Pa.

[73] Assignee: Oberg Industries, Freeport, Pa.

[*] Notice: The portion of the term of this patent subsequent to Aug. 8, 2006 has been disclaimed.

[21] Appl. No.: 446,934

[22] Filed: Dec. 6, 1989

Related U.S. Application Data

[63] Continuation-in-part of Ser. No. 326,484, Mar. 20, 1989, Pat. No. 4,886,973, which is a continuation of Ser. No. 84,453, Aug. 12, 1987, Pat. No. 4,855,606.

[51] Int. Cl.$^5$ ............................................. G01N 21/86
[52] U.S. Cl. .................................... 250/548; 250/557
[58] Field of Search .............. 250/548, 557; 356/400, 356/401; 226/24, 27, 32, 33; 83/61, 63

[56] References Cited

U.S. PATENT DOCUMENTS

| | | | |
|---|---|---|---|
| 4,813,320 | 3/1989 | Malloy et al. | 226/33 |
| 4,855,606 | 8/1989 | Walters | 250/548 |
| 4,886,973 | 12/1989 | Walters | 250/548 |

Primary Examiner—David C. Nelms
Attorney, Agent, or Firm—Stanley J. Price, Jr.

[57] ABSTRACT

A plurality of individual openings provided in a sheet strip material by a stamping device are passed in succession past a monitoring station positioned adjacent the outlet of the stamping device. As each individual opening is passed by the monitoring station, the monitoring station produces a plurality of voltage signals which identify the progress of each opening through the monitoring station and the progress of the sheet strip material through the stamping device. A controller is provided having an input for receiving the plurality of voltage signals produced as each opening passes by the monitoring station and an output connected to the stamping device. Within the controller, the plurality of voltage signals identifying the progress of an individual opening through the monitoring station are compared to the plurality of voltage signals identifying the progress of a following opening through the monitoring station. A deviation between the plurality of voltage signal sets identifies a sheet strip material misfeed condition within the stamping device. As soon as a sheet strip material misfeed condition is detected, the controller provides a signal to the stamping device to initiate stoppage of the stamping device.

10 Claims, 2 Drawing Sheets

METHOD AND APPARATUS FOR DETECTING A SHEET STRIP MATERIAL MISFEED CONDITION

CROSS-REFERENCE TO RELATED APPLICATIONS

This application is a continuation-in-part of co-pending U.S. application Ser. No. 326,484 entitled "Method And Apparatus For Detecting A Misfeed In A Stamping Press" filed Mar. 20, 1989 now U.S. Pat. No. 4,886,973, which in turn is a continuation of U.S. application Ser. No. 084,453 entitled "Method And Apparatus For Detecting A Misfeed In A Stamping Press" filed Aug. 12, 1987, now U.S. Pat. No. 4,855,606 on Aug. 8, 1989.

BACKGROUND OF THE INVENTION

1. Field of the Invention

This invention relates to a method and apparatus for monitoring the position of a sheet strip material passed through a stamping device, and more particularly, to a method and apparatus for detecting a sheet strip material misfeed condition within the stamping device as the sheet strip material progresses through the stamping device.

2. Description of the Prior Art

It is well known in the stamping art to pass a sheet strip material through a stamping device to produce a plurality of individual frames or stampings in the sheet strip material. The individual frames or stampings each have a configuration dependent upon the placement of the various punches in the movable portion of the stamping device. As the sheet strip material is passed through the stamping device, the movable portion of the stamping device is cycled into and out of contact with the sheet strip material to blank stock from the sheet strip material to provide a plurality of individual frames or stampings. After the individual frames exit the stamping device, the individual frames may be separated from one another for further use.

Since the stamping device operates at a high rate of speed, a sheet strip material misfeed condition within the stamping device resulting in frames being produced having an undesired configuration is normally undetected unless the stamping device operator shuts the system down and performs a visual inspection of the individual frames or stampings. Generally, by the time the operator stops the stamping device to inspect the individual frames or stampings, the misfeed condition results in a large number of frames or stampings being produced having an undesirable configuration. These frames or stampings must be removed from the sheet strip material for scrap.

As known in the art, a sheet strip material misfeed condition is identified as any condition, occurring either internally or externally to the stamping device, which prevents the sheet strip material from being at its proper location within the stamping device at any preselected instant of time relative to the movable portion of the stamping device.

In order to provide an early indication of a sheet strip material misfeed condition within the stamping device, various devices have been utilized.

Spring loaded micro-switches or other suitable contact-type switches have been employed internal to the stamping device to provide a material misfeed indication to the stamping device operator if the sheet strip material passing through the stamping device rolls over on itself or buckles within the stamping device. When this roll-over or buckle condition occurs, up to three layers of sheet strip material are provided to the movable punch assembly portion of the stamping device. When this occurs, the movable punch assembly is inhibited in its length of travel and, as a result, the micro-switch is not closed. If the micro-switch fails to close, a signal is provided to notify the stamping device operator of the roll-over or buckle condition. The use of a micro-switch or other mechanical contact-type switch internal to the stamping device is undesirable since these switches can only detect a roll-over or buckle condition when the movable portion of the stamping device is inhibited in its full length of travel. In addition, these switches will detect a roll-over or buckle condition only after the roll-over or buckling has occurred. The micro-switch cannot detect other types of misfeed conditions which may occur such as a change in the speed of the sheet strip material passing through the stamping device or a momentary jamming of the sheet strip material within the stamping device.

Therefore, there is a need for a non-contact detection apparatus for use with a stamping device that is capable of detecting a sheet strip material misfeed condition as the misfeed condition is occurring.

Although non-contact detecting devices are commercially available, these non-contact detecting devices are limited in that they only detect the thickness of a sheet strip material, or the presence or absence of a sheet strip material at a preselected location.

U.S. Pat. No. 2,587,631 discloses a method and device adapted to detect magnetic sheets which vary from a predetermined standard of thickness. U.S. Pat. No. 2,700,132 discloses a device for preventing the feeding of more than one thickness of magnetic sheet material into printing, fabricating or other sheet or blank treating machines, and includes an electronic double detector having an electromagnetic detecting head which is disposed in the path of travel of the sheets or blanks.

U.S. Pat. Nos. 2,994,015 and 3,069,601 disclose a magnetic detector for gauging or measuring the thickness of ferro-magnetic sheet material passed in proximity to a pair of magnetic detector heads.

U.S. Pat. No. 4,019,131 discloses a method and apparatus for measuring the shape of the wavy edges of metal strips. The measuring apparatus comprises an electromagnetic induction type non-contacting distance measuring device including a detection coil disposed near the edge of a running metal strip, a filter for deriving out the high frequency component and the low frequency component of the output of the detection coil, and means responsive to the high frequency component for determining the contour of the wavy edge of the strip. The device also includes a means responsive to the low frequency component for adjusting the lateral position of the detection coil with respect to the wavy edge of the metal strip.

U.S. Pat. No. 4,134,486 discloses a workpiece detection circuit in an article handling apparatus for aborting a workpiece from the apparatus whenever an unanticipated workpiece presence or absence is sensed.

U.S. Pat. No. 4,138,709 discloses a proximity switch which is adapted to close a circuit between a source and a load when a metal object is adjacent to the coil in the switch.

U.S. Pat. No. 4,420,747 discloses a sheet feed monitoring system for detecting missing or superimposed sheets fed to a sheet processing machine. The system includes a measuring device for generating signals increasing with the number of superimposed sheets and an evaluating device for emitting an electrical signal when irregularities occur.

While it has been suggested by the prior art devices to utilize contact-type switches to detect a sheet strip material roll-over or buckle condition within the stamping device and to utilize non-contact sensing devices to determine the thickness or presence of a sheet strip material at a preselected location, there is a need for an improved method and apparatus for detecting a sheet strip material misfeed condition within a stamping device as the misfeed condition is occurring. When the material misfeed condition is detected, the apparatus must be capable of providing a signal to the stamping device to initiate stoppage of the stamping device to allow the material misfeed condition to be corrected.

SUMMARY OF THE INVENTION

In accordance with the present invention there is provided apparatus for detecting a sheet strip material misfeed condition in a stamping device which includes a stamping device having an inlet portion and an outlet portion. The stamping device stamps a sheet strip material passing from the inlet portion to the outlet portion to provide a plurality of individual openings in the sheet strip material. A monitoring means is positioned adjacent the stamping device outlet portion, and means is provided for passing the plurality of individual openings stamped in the sheet strip material by the monitoring means. One embodiment of the monitoring means produces a plurality of individual monitoring means signals as each individual opening is passed through the monitoring means. Another embodiment of the monitoring means produces signals as each individual opening is passed above or below the monitoring means. A controller is provided having an input for receiving the plurality of monitoring means signals produced as each individual opening is passed through the monitoring means and an output from the monitoring means is connected to the stamping means. The controller includes means for comparing either the plurality of individual monitoring means signals produced as one individual opening is passed through the monitoring means to the plurality of individual monitoring means signals produced as a following opening is passed through the monitoring means or the signal produced as an individual opening is passed above or below the monitoring means. The controller provides a signal to the stamping device to initiate stoppage of the stamping device as soon as the plurality of individual monitoring means signals produced as the following individual opening is passed through the monitoring means deviate from the plurality of individual monitoring means signals produced as the previous opening is passed through the monitoring means.

Further in accordance with the present invention, there is provided a method for detecting a sheet strip material misfeed condition in a stamping device which includes the step of stamping a sheet strip material passing through a stamping device having an inlet portion and an outlet portion to provide a plurality of individual openings in the sheet strip material. The method includes the further steps of positioning a monitoring means adjacent the stamping device outlet portion, and passing each of the individual openings stamped in the sheet strip material by the monitoring means to produce a plurality of monitoring means signals for each said opening. The method includes the further steps of providing the plurality of monitoring means signals produced as each individual opening is passed by the monitoring means to a controller, and comparing within the controller the plurality of monitoring means signals produced for one said opening to the plurality of monitoring means signals produced for a following individual opening. The controller provides a signal to the stamping device to initiate stoppage of the stamping device as soon as the plurality of monitoring means signals produced for the following individual opening deviate from the plurality of monitoring means signals produced for a previous opening.

Accordingly, the principle object of the present invention is to provide a method and apparatus for detecting a sheet strip material misfeed condition within a stamping device as the sheet strip material progresses through the stamping device.

Another object of the present invention is to provide a method and apparatus for detecting a material misfeed condition within a stamping device and initiating stoppage of the stamping device as soon as material misfeed condition is detected.

These and other objects of the present invention will be more completely disclosed and described in the following specification, the accompanying drawings and the appended claims.

DESCRIPTION OF THE PREFERRED EMBODIMENTS

Figure 1:
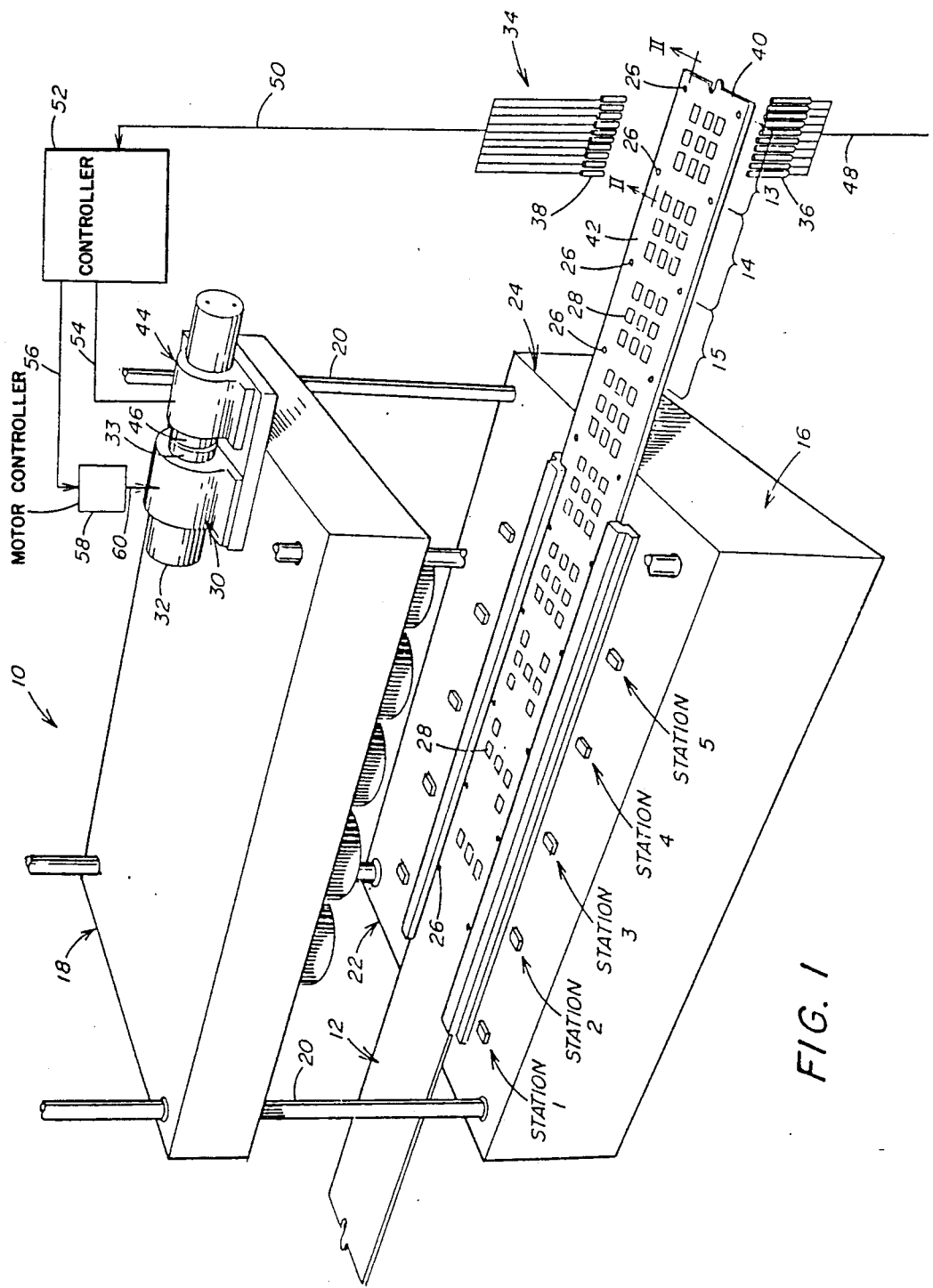
FIG. 1 is an isometric view of a stamping device and an apparatus for detecting a sheet strip material misfeed condition as the sheet strip material progresses through the stamping device.

Referring to the drawings and particularly to FIG. 1, there is illustrated apparatus generally designated by the numeral 10 for stamping in a sheet strip material 12 a plurality of individual stampings or frames such as stampings or frames 13, 14, 15 for purposes well known in the stamping art.

The stamping apparatus generally designated by the numeral 10 includes a stationary die assembly 16 and a movable press or punch assembly 18. Punch assembly 18 is positioned above and securely attached to stationary die assembly 16. Punch assembly 18 is mounted for reciprocal vertical movement on stationary die assembly 16 by mounting posts schematically illustrated by the numerals 20.

The stamping apparatus generally designated by the numeral 10 includes an inlet portion 22 and an outlet portion 24. Sheet strip material 12, supplied from a source (not shown), enters stamping apparatus 10 at inlet portion 22. As sheet strip material 12 progresses between stationary die assembly 16 and punch assembly 18 from inlet portion 22 to outlet portion 24, press assembly 18 is reciprocated vertically or cycled into and out of contact with stationary die assembly 16 to progressively stamp in sheet strip material 12 a plurality of stampings or frames such as frames 13, 14, 15, and a plurality of pilot holes 26 positioned along the longitudinal edges of sheet strip material 12. As seen in FIG. 1, the plurality of pilot holes 26 have substantially the same configuration and are equally spaced along each sheet strip material 12 longitudinal edge for purposes to be described herein.

Stamping apparatus 10 includes a plurality of individual stamping stations numbered 1-5. Although five stamping stations are illustrated, it should be understood that stamping apparatus 10 may include any number of stamping stations required to stamp the desired square openings 28 in sheet strip material 12 to produce frames such as frames 13, 14, 15. It should be further understood that the stamping apparatus generally designated by the numeral 10 is itself known in the art and is described herein only as it relates to the present invention.

At station 1, pilot holes 26 are blanked in sheet strip material 12. At stations 2-5, the plurality of square openings 28 are blanked in sheet strip material 12 to provide that, as sheet strip material 12 exits stamping apparatus 10 at outlet portion 24, sheet strip material 12 includes a plurality of individual stampings or frames such as frames 13, 14, 15 each having a plurality of square openings 28 blanked therein. Further, a plurality of equally spaced pilot holes 26 are positioned along the longitudinal edges of sheet strip material 12. It should be understood that the plurality of square openings 28 blanked in sheet strip material 12 are shown for illustrative purposes only. The configuration of the plurality of frames produced by stamping apparatus 10 may have any desired configuration, depending upon the configuration and position of each individual punch in punch assembly 18 and die positioned in stationary die assembly 16.

As seen in FIG. 1, a motor 30 is suitably connected to punch assembly 18 to cycle punch assembly 18 into and out of contact with stationary die assembly 16 as motor 30 first shaft 32 rotates. Although the first shaft 32 connection to movable punch assembly 18 is not specifically illustrated in FIG. 1, the connection between first shaft 32 and movable punch assembly 18 is itself well known in the art. As sheet strip material 12 progresses through stamping apparatus 10, the rotational movement of motor 30 first shaft 32 imparts reciprocal vertical movement to punch assembly 18 to drive the plurality of punches positioned in punch assembly 18 at stations 1-5 into and out of contact with sheet strip material 12. In this manner, material stock is blanked from sheet strip material 12 to provide a plurality of individual stampings or frames such as frames 13, 14, 15 in sheet strip material 12 and the plurality of equally spaced pilot holes 26. As previously described, the specific locations of the plurality of square openings 28 in sheet strip material 12 are shown in FIG. 1 for illustrative purposes only. Stamping apparatus 10 may be utilized to provide individual stampings or frames such as frames 13, 14, 15 having any preselected configuration selected to suit particular application requirements.

As seen in FIG. 1, motor 30 also includes a second shaft 33. Second shaft 33 is coupled by suitable means to encoder 44 input shaft 46. As motor 30 operates to rotate first shaft 32 at a preselected angular speed and thereby imparts reciprocal vertical movement to punch assembly 18, second shaft 33 rotates at the same angular speed to rotate encoder 44 input shaft 46. As is known in the art, encoder 44 produces a plurality of individual, serial pulses as input shaft 46 rotates. A plurality of individual, serial pulses are generated by encoder 44 each time movable punch assembly 18 is cycled into and out of contact with sheet strip material 12 positioned on stationary die assembly 16.

As described, each individual encoder pulse identifies a distinct position of punch assembly 18 relative to stationary die assembly 16 for each cycle of movable punch assembly 18. The plurality of encoder pulses generated each time movable punch assembly 18 is cycled into and out of contact with stationary die assembly 16 is referred to as a set, and a plurality of sets of encoder pulses are produced by encoder 44 as movable punch assembly 18 is continually cycled into and out of contact with stationary die assembly 16. The plurality of encoder pulse sets generated by encoder 44 as movable punch assembly 18 is continually cycled into and out of contact with stationary die assembly 16 are supplied to controller 52 on line 54. The function of each encoder pulse set supplied to controller 52 will be described later in greater detail.

Each cycle of punch assembly 18 into and out of contact with sheet strip material 12 positioned on stationary die assembly 16 is described herein in terms of angular movement. At 0°, punch assembly 18 is positioned at rest as illustrated in FIG. 1 and is spaced from stationary die assembly 16. At 90°, punch assembly 18 has traveled half the distance between its rest position of 0° and stationary die assembly 16. At 180°, punch assembly 18 contacts sheet strip material 12 and blanks the plurality of individual openings 28 in sheet strip material 12. At approximately 270°, punch assembly 18 has cleared sheet strip material 12, and thereafter punch assembly 18 returns to its rest position of 0°. As soon as punch assembly 18 clears the surface of sheet strip material 12, sheet strip material 12 is advanced between stamping stations. As punch assembly 18 reaches approximately 90°, sheet strip material 12 is stopped in preparation for stamping. After punch assembly 18 blanks sheet strip material 12 and again clears the surface of sheet strip material 12, sheet strip material 12 is advanced between stamping stations. As previously described, since encoder 44 produces a plurality of individual encoder pulses each time punch assembly 18 is cycled into and out of contact with sheet strip material 12, each distinct position of punch assembly 18 in any given cycle may be identified by an individual encoder pulse.

As described, each distinct position of punch assembly 18 from a rest position of 0° through the blanking position of 180° and back to the rest position of 0° is identified by an individual encoder pulse produced by encoder 44. The plurality of encoder pulses produced by encoder 44 for each stamping cycle are provided to controller 52.

In order to detect a misfeed condition as sheet strip material 12 progresses through stamping apparatus 10, sheet strip material 12 including a plurality of individual such as frames 13, 14, 15 and a plurality of pilot holes 26 exits stamping apparatus 10 at outlet portion 24 and is passed through a monitoring station generally designated by the numeral 34.

As seen in FIG. 1, the monitoring station generally designated by the number 34 includes a plurality of light sources 36 positioned a fixed preselected distance beneath a common bottom surface 40 of sheet strip material 12 and a plurality of light detectors 38 positioned a fixed preselected distance above a common top surface 42 of sheet strip material 12. Although the plurality of light sources 36 and plurality of light receivers 38 are positioned as shown in FIG. 1, it should be understood that their respective positions may be reversed without departing from this invention.

Any suitable light sources and light receivers may be utilized in monitoring station 34. Although the remainder of the specification will refer to the light sources 36 as light emitting diode sources (LED sources) and the light detectors 38 as light emitting diode receivers (LED receivers), it should be understood that other types of light sources and light detectors may be used without departing from this invention.

Each of the plurality of individual LED sources 36 and LED receivers 38 are positioned beneath and above the common bottom and top surfaces 40, 42 of sheet strip material 12, respectively, to lie on a longitudinal line between the plurality of pilot holes 26 blanked along a preselected longitudinal edge of sheet strip material 12. After sheet strip material 12 exits stamping apparatus 10 at outlet portion 24, sheet strip material 12 is passed between the plurality of individual LED sources 36 and LED receivers 38 so that the plurality of pilot holes 26 blanked along a preselected longitudinal edge of sheet strip material 12 are passed in succession between the plurality of individual LED sources 36 and LED receivers 38. As seen in FIG. 1, the plurality of LED sources 36 and LED receivers 38 are so aligned to provide that the plurality of pilot holes 26 blanked in sheet strip material 12 are passed in succession between one LED source 36 and one LED receiver 38. In addition, the plurality of LED sources and receivers 36, 38 may be positioned to provide that a single pilot hole 26 passes between the LED sources and receivers before a following pilot hole 26 enters monitoring station 34. It should be understood that the plurality of pilot holes 26 lying along either sheet strip material 12 longitudinal edge may be passed in succession through monitoring station 34 without departing from this invention.

Figure 2:
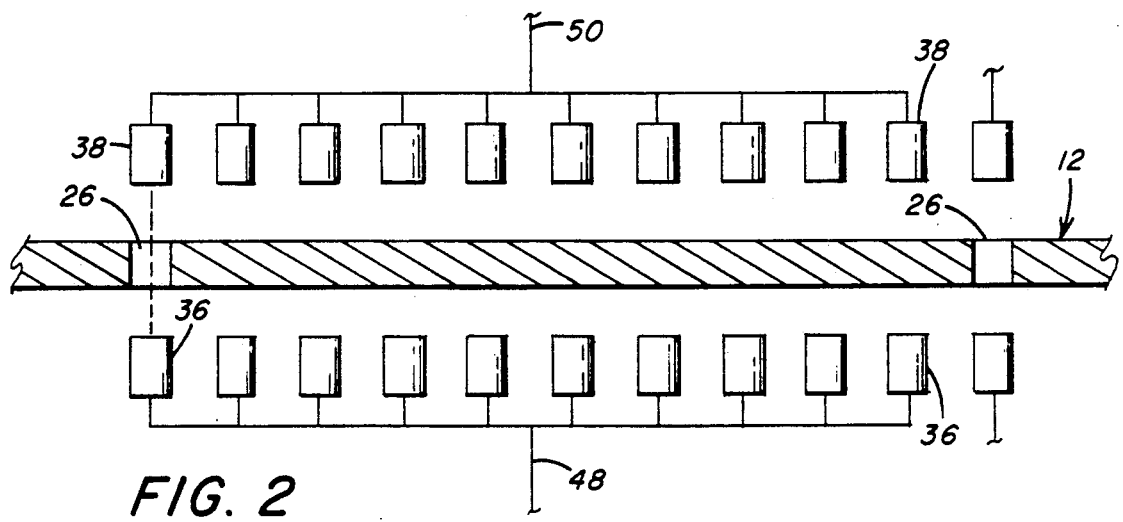
FIG. 2 is a sectional view of a portion of sheet strip material taken along line II—II of FIG. 1, illustrating a plurality of individual light sources aligned with and spaced from a plurality of individual light detectors.

The LED sources 36 and LED receivers 38 illustrated herein are well known in the art, as is their operation. Although ten individual LED sources 36 and ten individual LED receivers 38 are illustrated in FIGS. 1 and 2, it should be understood that any number of LED sources and receivers may be utilized depending on the physical size of the LED sources and receivers and the spacing between adjacent pilot holes 26 blanked along the longitudinal edges of sheet strip material 12.

Each of the LED sources 36 are connected to a power source (not shown), and power is supplied to each LED source 36 on line 48. Each of the LED sources 36 is constantly energized to provide a plurality of constant light sources. As seen in FIG. 2, as sheet strip material 12 is passed between the plurality of LED sources 36 and LED receivers 38, the plurality of pilot holes 26 stamped in sheet strip material 12 along a preselected longitudinal edge are passed in succession between aligned pairs of LED sources 36 and LED receivers 38. As each pilot hole 26 progresses through monitoring station 34 and is passed between aligned pairs of LED sources and LED receivers 36, 38, the light provided by each LED source 36 positioned beneath pilot hole 26 will pass through pilot hole 26 and be detected by the receiver 38 positioned above the pilot hole.

As described, as a single pilot hole 26 progresses between the plurality of LED sources 36 and LED receivers 38, light produced by each LED source 36 will be received in succession by the aligned LED receiver 38. As light is received by each individual LED receiver 38, the LED receiver provides a voltage signal on line 50 to controller 52 illustrated in FIG. 1. The voltage signal provided to controller 52 by each LED receiver 38 is an "on-off" or digital voltage signal. It is seen that the progression of each pilot hole 26 between aligned pairs of LED sources and receivers 36, 38 is identified by a plurality of successive digital voltage signals provided to controller 52 as each LED receiver 38 is activated by an aligned LED source 36.

The plurality of voltage signals produced by the LED receivers 38 are provided to controller 52 on line 50. As previously described, encoder 44 also provides a set of encoder pulses to controller 52 on line 54 each time movable punch assembly 18 is cycled into and out of contact with stationary die assembly 16. As each individual pulse in an encoder pulse set is received by controller 52, controller 52 reads or samples the magnitude of the digital voltage signals produced by the plurality of LED receivers 38 as a single pilot hole 26 blanked in sheet strip material 12 is passed between aligned LED sources and receivers 36, 38.

For example, if encoder 44 provides 1,024 individual serial encoder pulses to controller 52 for each cycle of punch assembly 18 into and out of contact with stationary die assembly 16, controller 52 will read or sample the magnitude of the digital voltage signals produced by the plurality of LED receivers 38, 1,024 times per cycle. As described, as each pilot hole 26 is successively passed between the aligned plurality of LED sources and receivers 36, 38, controller 52 takes 1,024 voltage signal readings. Each of the 1,024 individual voltage signal readings identifies a distinct position of punch assembly 18 relative to stationary die assembly 16 for each cycle, and the position of a single pilot hole 26 progressing between the aligned LED sources and receivers 36, 38. The voltage signal readings taken by controller 52 for each pilot hole 26 passing between aligned LED sources and receivers 36, 38 are stored within controller 52.

Each individual voltage signal sampled or read by controller 52 as each individual encoder pulse in an encoder pulse set is received from encoder 44 identifies the position of movable punch assembly 18 and also identifies the position of an individual pilot hole 26 progressing between the plurality of aligned LED sources and receivers 36, 38. The plurality of voltage signal readings taken by controller 52 as a single pilot hole 26 passes between the plurality of aligned LED sources and receivers are stored within controller 52 and compared within controller 52 to the plurality of voltage signal readings taken as a following pilot hole 26 passes between the plurality of aligned LED sources and receivers 36, 38.

If no sheet strip material 12 misfeed condition occurs within stamping apparatus 10, the plurality of digital voltage signal readings taken by controller 52 as each pilot hole 26 is passed between the plurality of LED sources and receivers 36, 38 and compared within controller 52 will be repetitive. However, if a sheet strip material 12 misfeed condition occurs which prevents an individual pilot hole 26 from being at the proper location between LED sources and receivers 36, 38 for any distinct position of punch assembly 18 relative to die assembly 16, the plurality of digital voltage signal readings taken by controller 52 as the misfeed condition is occurring will not repeat the plurality of voltage signal readings taken by controller 52 prior to the sheet strip material 12 misfeed condition. As controller 52 compares the plurality of individual voltage signal readings taken prior to the misfeed condition to the plurality of individual voltage signal readings taken during the misfeed condition, the deviation between the voltage signal readings will be detected by controller 52. The deviation between voltage signal readings identifies a sheet strip material 12 misfeed condition to the controller.

Any occurrence which takes place either internally or externally of stamping apparatus 10 to prevent sheet strip material 12 from being at its proper location within stamping apparatus 10 at any preselected instant of time relative to the position of movable punch assembly 18 will prevent an individual pilot hole 26 from being at its proper position between aligned pairs of LED sources and receivers 36, 38 for the same instant of time and will be indentified by controller 52 as a material misfeed condition.

When a sheet strip material 12 misfeed condition is detected by controller 52, controller 52 provides an error signal on line 56 to motor controller 58. When motor controller 58 receives this error signal, motor controller 58 interrupts the voltage provided to motor 30 on line 60 to initiate stoppage of stamping apparatus 10.

Although it has been described herein to detect a sheet strip material 12 misfeed condition by passing a plurality of individual pilot holes 26 stamped in a sheet strip material 12 in succession between a plurality of longitudinally aligned light sources and detectors 36, 38, it should be understood that the configuration of the plurality of light sources and detectors 36, 38 may be varied depending upon the arrangement of the openings blanked in the sheet strip material and passed through the monitoring station. In addition, although the plurality of pilot holes 26 blanked in sheet strip material 12 are used to monitor the progress of sheet strip material 12 through stamping apparatus 10 and detect a sheet strip material 12 misfeed condition, other openings stamped in sheet strip material 12 may be used with similar results.

For example, depending upon the configuration of the individual frames such as frames 13, 14, 15 stamped in sheet strip material 12, the frames themselves may be passed between the plurality of light sources and detectors 36, 38 to monitor the progress of sheet strip material 12 through stamping apparatus 10 and detect a sheet strip material 12 misfeed condition.

So long as sheet strip material 12 includes a plurality of individual blanked openings equally spaced therein, and the plurality of openings are capable of being passed in succession between aligned pairs of light sources and light detectors, the plurality of equally spaced openings may be used to monitor the progress of sheet strip material 12 through the stamping apparatus 10 to detect a sheet strip material 12 misfeed condition.

Figure 3:
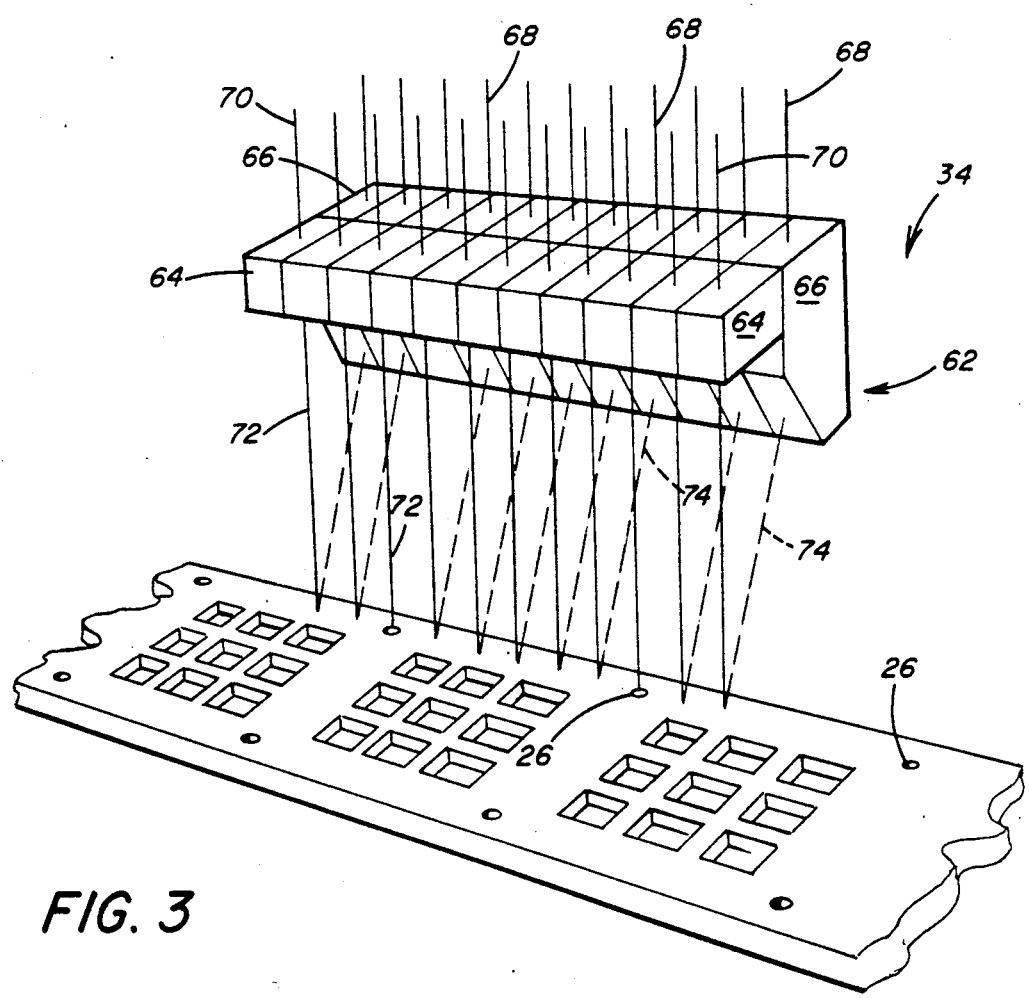
FIG. 3 is a fragmentary view similar to view FIG. 2 illustrating a plurality of individual reflective photo optic devices for detecting a sheet strip material misfeed condition as the sheet strip material progresses past the reflective photo optic devices.

FIG. 3 illustrates another embodiment of the invention where a plurality of reflective photo optic devices generally designated by the numeral 62 are positioned above the strip 12 at the monitoring station 34. Each of the reflective photo optic devices 62 include a fiber optic light transmitting unit 64 and a reflective receiver unit 66.

Any reflective sensor device that transmits a directional beam of light or any directional reflective signal from a source onto the surface of the strip 12 and reflects the light source or other directional signal to a receiver may be used. For example, a suitable reflective photo optic sensor is manufactured by the Bolan-Jenner Industries, Box 1020, Blueberry Hill Industrial Park, Woburn, Miss. 01801. The model BLYE reflective unit and the model M583 or 8230 fiber optic unit are suitable.

The light source is directed onto the surface of the sheet metal strip 12 and is reflected by the surface of the strip 12 back to the receiver 66 which is located adjacent to the fiber optic light transmitting unit 64. The reflected light produces a signal in the receiver 66 which is transmitted through lines 68 to the controller 52. A source of power is provided to the light transmitting unit 64 through a line 70 so that the light source is projected from the transmitter 64 onto the surface of the sheet 12.

The light source is focused by the fiber optic device so that it is aligned with the pilot holes 26 on the strip 12 and the light source is reflected back from the surface of the strip 12 to the receiver 66. The light source for each unit is designated by the numeral 72 and the reflective signal is designated by the numeral 74. When the pilot holes 26 pass beneath a light source 72, the light source 72 passes through the pilot hole 26 and is not reflected back to the receiver 66 as is illustrated in FIG. 3 and sends the appropriate signal to the controller 52. In this manner, as previously described with reference to the LED detectors, signals will be provided to the controller to detect a misfeed condition when the signals between a pair of pilot holes do not match the signals from the detectors transmitted between the previous pilot holes 26.

It should be understood that the reflective photo optic sensors may be positioned either above or below the surface of the metal strip 12 and should be arranged to project the light sources onto a surface of the strip where the openings of either the pilot holes 26 or other openings formed in the metal strip are present.

The operation of the reflective photo optic sensors are the same as the LED units previously described. However, with the reflective photo optic sensors, the signal transmitter and receiver units are positioned either above or below the strip 12 and does not require portions of the sensor to be positioned both above and below the strip and require the light source to pass through the holes to provide the signals by passing the signal through the strip and having the signals received or detected by a receiver on the opposite side of the strip.

According to the provisions of the Patent Statutes, I have explained the principle, preferred construction and mode of operation of my invention and have illustrated and described what I now consider to represent its best embodiments. However, it should be understood that within the scope of the appended claims, the invention may be practiced otherwise than as specifically illustrated and described herein.

I claim:

1. Apparatus for detecting a sheet strip material misfeed condition in a stamping press having an intermittent feed comprising, stamping means having an intermittent feed of sheet strip material, said stamping means having an inlet portion and an outlet portion, said stamping means arranged to stamp a sheet strip material passing from said inlet portion to said outlet portion to provide a plurality of individual openings in said sheet strip material, monitoring means adjacent said stamping means outlet portion, means for passing said plurality of individual openings in said sheet strip by said monitoring means, said monitoring means producing a pattern of signals from a plurality of monitoring means signals as each said opening in said sheet strip is passed by said monitoring means, controller means having an input for receiving said plurality of monitoring means signals produced as each said opening in said sheet strip is passed by said monitoring means and an output connected to said stamping means, said controller means including means for comparing said pattern of signals from a plurality of monitoring means signals produced as one of said openings in said sheet strip passes by said monitoring means to another pattern of signals from a plurality of monitoring means signals produced as a following opening in said sheet strip passes by said monitoring means, and said controller means providing a signal to said stamping means to initiate stoppage of said stamping means as soon as said pattern of signals from a plurality of monitoring means signals produced by a following opening in said sheet strip passing by said monitoring means deviates from said pattern of signals from a plurality of monitoring means signals produced when a prior opening in said sheet strip was passed by said monitoring means.

2. Apparatus for detecting a sheet strip material misfeed condition in a stamping press having an intermittent feed as set forth in claim 1 in which said monitoring means is positioned either above or below a surface of said sheet strip material.

3. Apparatus for detecting a sheet strip material misfeed condition in a stamping press having an intermittent feed as set forth in claim 1 which includes, a plurality of reflective signal producing devices and reflected signal receiver devices positioned to provide that each said opening in said strip material exiting said stamping means outlet portion passes by said reflective signal producing devices and said reflective signal receiver devices to provide a plurality of signals to said controller means for each said opening in said strip material.

4. Apparatus for detecting a sheet strip material misfeed condition in a stamping press having an intermittent feed as set forth in claim 3 in which, each said reflective signal producing device includes a light source aligned with said plurality of openings in said sheet strip material and said reflective signal receiver device arranged to receive the light source reflected from a surface of said sheet strip material.

5. Apparatus for detecting a sheet strip material misfeed condition in a stamping press having an intermittent feed as set forth in claim 4 in which, each said reflective signal producing device provides an individual monitoring means signal to said controller means as said light source passes through said opening and fails to provide a reflected signal to said associated reflected signal receiver device.

6. Apparatus for detecting a sheet strip material misfeed condition in a stamping press having an intermittent feed as set forth in claim 1 in which, said plurality of individual openings in said sheet strip material are spaced from each other by a substantially repeatable distance.

7. A method for detecting a sheet strip misfeed condition in a stamping press having an intermittent feed comprising the steps of, intermittently stopping a sheet strip feed into a press and stamping said sheet strip material passing through said press to provide a plurality of openings in said sheet strip material, positioning a monitoring means adjacent an outlet portion of said press, passing each said opening in said sheet strip material by said monitoring means to produce a pattern of a plurality of monitoring means signals, transmitting said pattern of a plurality of monitoring means signals produced as each said opening is passed by said monitoring means to a controller means, comparing within said controller means said pattern of a plurality of monitoring means signals produced for one said opening to a pattern of said plurality of monitoring means signals produced by a prior opening, and transmitting a signal from said controller means to said press to initiate stoppage of said press as soon as said pattern of said plurality of monitoring means signals produced by an opening deviates from said pattern of said plurality of monitoring means signals produced by a prior opening.

8. A method for detecting a sheet strip material misfeed condition in a stamping press having an intermittent feed as set forth in claim 7 including, positioning said monitoring means either above or below a surface of said sheet strip material.

9. A method for detecting a sheet strip material misfeed condition in a stamping press having an intermittent feed as set forth in claim 7 which includes, positioning a plurality of reflective signal producing devices and reflected signal receiver devices in spaced relation to the same surface of said sheet strip material.

10. A method of detecting a sheet strip material misfeed condition in a stamping press having an intermittent feed as set forth in claim 7 which includes, aligning said reflective signal producing devices with a respective reflected signal receiver device so that said reflective signal producing device provides a signal to said associated reflected signal receiver device from the surface of said sheet strip material in the absence of an opening therein.

* * * * *